United States Patent [19]

Schafer

[11] 4,256,475
[45] Mar. 17, 1981

[54] HEAT TRANSFER AND STORAGE SYSTEM

[75] Inventor: James P. Schafer, Little Falls, Minn.

[73] Assignee: Carrier Corporation, Syracuse, N.Y.

[21] Appl. No.: 960,897

[22] Filed: Nov. 15, 1978

Related U.S. Application Data

[63] Continuation of Ser. No. 817,947, Jul. 22, 1977, abandoned.

[51] Int. Cl.$^3$ ............................................. F25B 27/00
[52] U.S. Cl. ............................................. 62/2; 165/2;
165/29; 165/48 S; 165/62; 165/104 S; 237/2 B;
62/238.7; 62/324 D
[58] Field of Search .................... 165/1, 2, 29, 58, 62,
165/140, 104 S, 48 S; 237/2 B; 62/2, 238 E, 324 D

[56] References Cited

U.S. PATENT DOCUMENTS

| | | | |
|---|---|---|---|
| 2,747,381 | 5/1956 | Lazar | 62/128 |
| 3,253,651 | 5/1966 | Larson | 165/122 |
| 3,523,575 | 8/1970 | Olivieri | 165/22 |
| 3,996,759 | 12/1976 | Meckler | 62/2 |

Primary Examiner—Albert W. Davis
Assistant Examiner—Margaret A. Focarino
Attorney, Agent, or Firm—J. Raymond Curtin; John S. Sensny

[57] ABSTRACT

A heat transfer and storage system for heating and cooling an enclosure, and including a heat pump having an indoor coil and an outdoor coil and a heat storage facility. The system can be operated to exchange heat between a refrigerant fluid from the heat pump and a heat transfer fluid from the heat storage facility, between the refrigerant fluid and ambient air, and between the heat transfer fluid and ambient air. In a preferred embodiment an integrated three medium heat exchanger is utilized in association with the outdoor coil of the heat pump and a water coil operatively connected to a water tank; and the three medium heat exchanger can effect heat exchange between the refrigerant and the water, between the refrigerant and outdoor air, and between the water and outdoor air.

13 Claims, 4 Drawing Figures

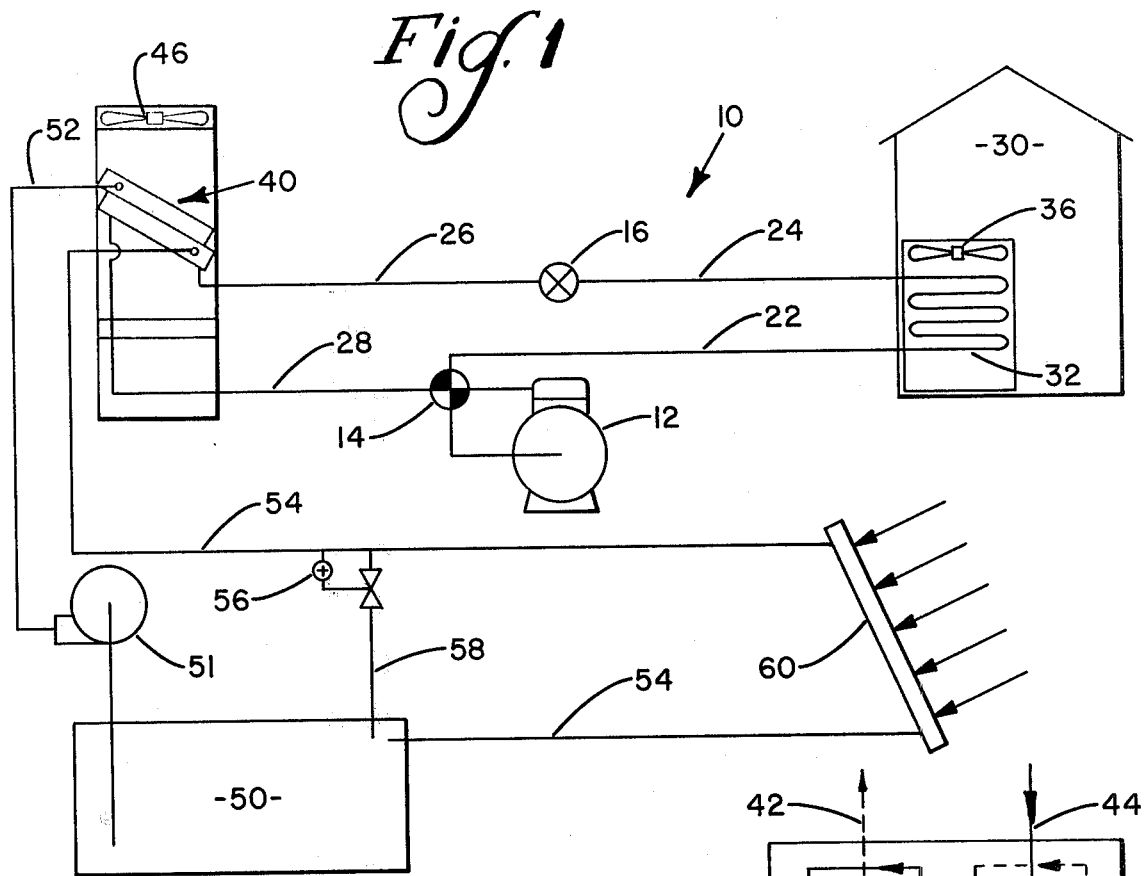
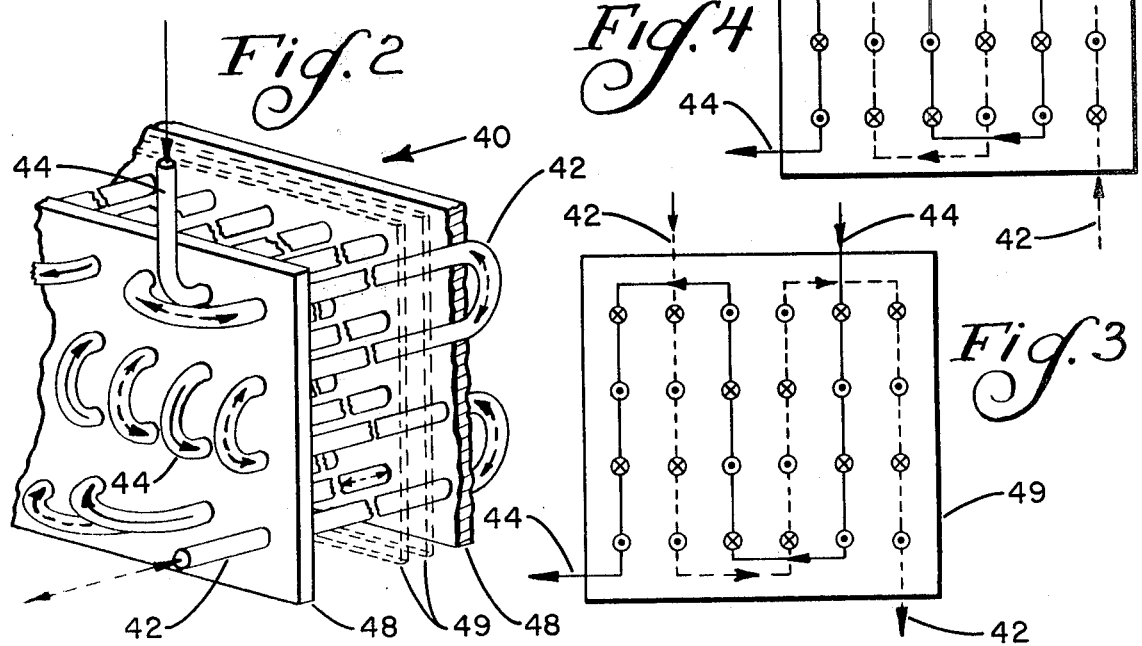

HEAT TRANSFER AND STORAGE SYSTEM

This is a continuation of application Ser. No. 817,947 filed July 22, 1977, now abandoned.

BACKGROUND OF THE INVENTION

This invention relates to a new and improved heating and cooling apparatus, and more specifically to a heat transfer and storage system utilizing a heat pump and a heat storage system such as a water tank and solar collector.

Generally, a heat pump comprises a compressor, an expansion valve, an indoor heat exchange coil, an outdoor heat exchange coil, a refrigerant fluid, suitable refrigerant pipe line, and a refrigerant flow reversing valve. The heat pump has two sides; a low pressure side and a high pressure side. This pressure difference is caused by the compressor and expansion valve which also separate the two sides. One heat exchanging coil is located on one pressure side while the second coil is on the other side, and generally one coil is located inside an enclosure to be heated or cooled and the other coil is located outdoors. The reversing valve is used to reverse the direction of the flow of refrigerant through the heat pump which has the effect of reversing the pressure sides. Thus, at one time the inside coil can be on the low pressure side while at another time the outside coil can be on the low pressure side. Heat is absorbed by the refrigerant in the coil on the low pressure side and given up by the refrigerant in the coil on the high pressure side.

Thus, a heat pump transfers heat between the indoor and outdoor coil depending on the position of the reversing valve. The heat pump can be used, for example, during cold weather to move heat from the outdoors to an indoor enclosure to warm the enclosure. At times when the outdoor temperature is very low a heat pump cannot transfer enough heat from the outdoors to the enclosure to satisfactorily warm the enclosure and requires supplemental heat such as electrical resistance heating. The system disclosed herein provides supplemental heat from inexpensive heat sources such as solar heat by utilizing a heat storage facility such as an insulated water tank to transfer heat either to the indoors directly or to the heat pump which then transfers the heat indoors. Heat can be put into the heat storage facility from the heat pump when it is convenient and economical to do so or from another heat source such as a solar collector and stored until needed.

In addition to assisting a heat pump in heating an enclosure, a heat storage facility can also be used to assist the heat pump in cooling the enclosure. For example, if the temperature of the heat storage facility is lower than the temperature of the air surrounding the outdoor coil of the heat pump, then the heat pump can operate more efficiently if heat from the outdoor coil, which is the condenser coil when the heat pump is cooling the enclosure, is transferred to the heat storage facility than if the heat is transferred to the relatively warmer ambient air.

The system disclosed utilizes an integrated three medium heat exchanger. A suitable heat exchanger of this type is disclosed in copending application Ser. No. 817,946 filed July 22, 1977 now abandoned in the names of David F. Wilson and Thomas E. Brendel. In a preferred embodiment the three medium heat exchanger is used to effect heat exchange between air, water from the heat storage facility, and refrigerant from the heat pump. An air-water refrigerant heat exchanger, when used with a heat pump, can improve the efficiency of the heat pump in several ways. For example, if the air-water-refrigerant heat exchanger is used in association with the outdoor coil of the heat pump, then when the heat pump is used to heat the enclosure and the outdoor coil functions as the evaporator coil the build up of frost on the evaporator coil can be eliminated. Also, an integrated unit has inherent advantages of low cost, minimum complexity, and compactness which are particularly desirable in systems designed for use in residential homes.

SUMMARY OF THE INVENTION

An object of this invention is to improve heat transfer and storage systems.

Another object of this invention is to improve the operating characteristics of heat pumps.

A further object of this invention is to reduce the size, cost, and complexity of a heat transfer and storage system.

A still further object of this invention is to provide an improved heat pump and heat storage system which allows for the transfer of heat between the outdoors and an indoor enclosure between the indoor enclosure and a heat storage facility, and directly between the outdoors and the heat storage facility.

A further object of this invention is to utilize in a heat transfer and storage system an integrated three medium heat exchanger which allows for the selective transfer of heat between two independent heat exchanging mediums as well as between each of these mediums and the ambient air.

These and other objects are achieved by using in a heat transfer and storage system a three medium heat exchanger which has two independent fluid circuits each in thermal contact with the other as well as in thermal contact with the ambient air. A heat transfer medium such as water from a heat storage facility such as an insulated water tank can flow through one fluid circuit while another heat transfer medium such as a refrigerant from a heat pump can flow through the other circuit. A fan is provided which can force ambient air over the heat exchanger in thermal contact with the heat transfer mediums flowing through the heat exchanger. Heat can be exchanged between the two heat transfer mediums, and heat can be exchanged between any one or both of these mediums and the ambient air. In a preferred embodiment the three medium heat exchanger is located outside an enclosure in association with one coil of a heat pump, whose second coil is located inside the enclosure, and a water coil operatively connected to an insulated water tank.

Further benefits and advantages of the invention will become apparent from a consideration of the following description given with reference to the accompanying drawings which specify and show a preferred embodiment of the invention.

BRIEF DESCRIPTION OF THE DRAWINGS

FIG. 1 is a schematic showing of a heat transfer and storage system constructed in accordance with the present invention. The system includes a heat pump, a heat storage facility, and a solar heat collector.

FIG. 2 is a frontal perspective view of an integrated three medium heat exchanger with portions broken away to better illustrate the two independent fluid circuits.

FIG. 3 is a fluid schematic representation of the heat exchanger of FIG. 2 to illustrate the direction of flow of fluids through the two independent fluid circuits of the heat exchanger when heat is being transferred from the heat storage facility to the heat pump.

FIG. 4 is a fluid schematic representation of the heat exchanger of FIG. 2 to illustrate the direction of flow of fluids through the two independent fluid circuits of the heat exchanger when heat is being transferred from the heat pump to the heat storage facility.

A DETAILED DESCRIPTION OF A PREFERRED EMBODIMENT

Referring to the drawings in detail, FIG. 1 is a mechanical schematic of a heat transfer and storage system constructed in accordance with the present invention. The system comprises, a heat pump 10 containing a heat transfer medium such as a refrigerant and a heat storage facility 50 such as an insulated water tank containing a heat exchanging medium such as water. While a preferred embodiment of the invention is used in combination with a solar heat collector 60, other types of heat sources can be combined with the heat transfer and storage system, or the heat transfer and storage system can be used alone to obtain the benefits, objectives, and advantages disclosed herein.

The heat pump 10 comprises a compressor 12, a refrigerant flow reversing valve 14, a reversible expansion valve 16, an indoor coil 32 which is placed inside an enclosure 30, an outdoor coil 42, shown in FIGS. 2, 3, and 4, which is supported in a three medium heat exchanger 40, and refrigerant lines 22, 24, 26 and 28. A water pump 51 circulates water from the water tank 50 through a water supply line 52 to a water coil 44, shown in FIGS. 2, 3, and 4, which is supported in the three medium heat exchanger 40. The water circulates through the water coil 44 and then back to the water tank 50 through a water return line 54. Water return line 54 carries the water through a solar heat collector 60. A by-pass valve 56 and a by-pass water line 58 are provided to return the water from the water coil 44 directly to the water tank 50 when it is desired to by-pass the solar heat collector 60. Also, a fan 36 is provided to force ambient air over the indoor coil 32 of the heat pump 10, and a fan 46 is provided to force ambient air over both coils 42 and 44 of the heat exchanger 30.

The three medium heat exchanger 40 is an air-water-refrigerant heat exchanger and, as shown in FIGS. 2, 3, and 4, is formed by interpositioning the outdoor coil 42 of the heat pump 10 with the water coil 44. The outdoor coil 42 is supported by and passed between tube sheets 48 and the refrigerant from the heat pump 10 is circulated through the coil 42 in either direction, as indicated by the dashed lines of FIGS. 2, 3, and 4. The direction of flow of refrigerant depends upon the particular mode of operation of the heat pump 10. When the heat pump 10 is operating in its heating mode, that is, it is being used to heat the enclosure 30, the refrigerant circulates through coil 42 as shown by the dashed line in FIG. 3. When the heat pump 10 is operating in its cooling mode, that is, it is being used to cool the enclosure 30, the refrigerant circulates through coil 42 as shown by the dashed line in FIG. 4. The water coil 44 is also passed between the same tube sheets 48 and water from the storage tank 50 is circulated through the coil 44 in the direction indicated by the solid lines of FIGS. 2, 3, and 4. The coils 42 and 44 are each supported by the tube sheets 48 in alternate, vertical planes and carry a plurality of common coil fins 49 throughout the length of the coil extending between the tube sheets 48.

At the air-water-refrigerant heat exchanger 40 heat can be exchanged between the various heat transfer mediums passing through it. For example, by activating the heat pump 10 and water pump 51 and leaving the fan 46 inactivated, heat can be exchanged between the heat pump refrigerant passing through coil 42 and the water passing through coil 44. Or by activating the heat pump 10 and the fan 46 and leaving the water pump 51 inactivated, heat can be exchanged between the heat pump refrigerant passing through coil 42 and the ambient air. Or by activating water pump 51 and the fan 46 and leaving the heat pump 10 inactivated, heat can be exchanged between the water passing through coil 44 and the ambient air.

Heat can be put into the water tank 50, to be stored for later use, in a variety of ways. For example, if water pump 51 is activated, then water from the water tank 50 can pass through and absorb heat from the solar heat collector 60 and return to the water tank 50. Also, when the heat pump 10 is functioning in its cooling mode, that is, it is being used to cool the enclosure 30 and waste heat from the enclosure 30 is being transferred by the heat pump 10 from the indoor coil 32 to the outdoor coil 42, this waste heat can be transferred to the water tank 50 by activating the water pump 51. Water pump 51 circulates water from the water tank 50 through the water coil 44. While passing through the water coil 44, the water can absorb heat from the refrigerant passing through the outdoor coil 42. This heated water then returns to the water tank 50 either directly or through the solar heat collector 60. In this manner, waste heat from the enclosure 30 can be taken out of the enclosure 30 and stored in the heat storage facility 50 for later use.

To better illustrate the manner in which the heat transfer and storage system of the present invention functions, the system will be described for both heating and cooling the enclosure 30.

To heat the enclosure 30, fans 36 and 46 are activated and the heat pump 10 is activated in its heating mode. At the outdoor coil 42 the heat pump refrigerant absorbs heat from the ambient air as this air is forced over the outdoor coil 42 by the fan 46. The heat pump 10 then transfers this heat to the indoor coil 32 where it is released to the ambient air being forced over the coil 32 by fan 36.

If the heat pump 10 cannot transfer enough heat from the outdoor air to the enclosure 30 to satisfactorily warm the enclosure 30, then heat that had previously been put into the water tank 50 can be used to assist the heat pump 10. This assistance is initiated by activating water pump 51. Water pump 51 circulates water from the water tank 50 through the water coil 44 of the heat exchanger 40. The water carries heat that had been stored in the water tank 50. As the water passes through water coil 44 much of this heat is transferred to the refrigerant passing through the outdoor coil 42 of the heat pump 10 which then transfers this heat, along with any heat absorbed from the ambient air, to the enclosure 30 via the indoor coil 32. If the enclosure 30 can be satisfactorily warmed by heat transferred to the enclosure via the heat pump 10 from the storage tank 50 alone so that it is not necessary to transfer any heat from the outdoor air to the enclosure, then the fan 46 can be deactivated and ambient air will not be forced over the outdoor coil 42. After leaving the water coil 44, the water can pass by means of water return line 54 through the solar heat collector 60 and then return to the water tank 50 so that radiant heat from the sun can be transferred to the water tank 50. Or, if it is desired to by-pass the solar heat collector 60, then water can pass from the water coil 44 to the water tank 50 through by-pass water line 58 by activating by-pass valve 56.

To cool the enclosure, fans 36 and 46 are activated and the heat pump 10 is activated in its cooling mode. At the indoor coil 32 the heat pump refrigerant absorbs heat from the ambient air as this air is forced over the indoor coil 32 by fan 36. The heat pump 10 transfers this heat to the outdoor coil 42 where it is released to the ambient air being forced over the coil 42 by fan 46. Water pump 51 can be activated so that, as explained above, water from the water tank 50 passes through the water coil 44, absorbs heat from the refrigerant passing through the outdoor coil 42 of the heat pump 10, and then returns to the water tank 50. This is a useful mode of operation not only to store waste heat from the enclosure 30 for later use, but also, in case the water in the water tank 50 is at a lower temperature than the air surrounding the outdoor coil 42, to improve the operating efficiency of the heat pump 10.

While it is apparent that the invention herein disclosed is well calculated to fulfill the objects above stated, it will be appreciated that numerous modifications and embodiments may be devised by those skilled in the art and it is intended that the appended claims cover all such modifications and embodiments as fall within the true spirit and scope of the present invention.

What is claimed is:

1. A heat transfer and storage system for heating and cooling an enclosure, comprising:
   a compressor for compressing vaporous refrigerant;
   an indoor heat exchange coil located inside the enclosure;
   a refrigerant expansion device;
   a refrigerant flow reversing means;
   a three medium heat exchanger located outside the enclosure and including a second heat exchange coil, a third heat exchange coil, heat transfer means thermally connecting the second and third coils, and means to pass ambient air over the second and third coils;
   first connecting means connecting the compressor, the indoor heat exchange coil, the refrigerant expansion device, the refrigerant flow reversing means, and the second heat exchange coil to form a reversible, vapor compression refrigeration system for transferring heat between the indoor coil and the three medium heat exchanger;
   a heat storage facility for storing a heat transfer fluid; and
   second connecting means connecting the heat storage facility and the third heat exchange coil, wherein the heat transfer fluid circulates and transfers heat between the heat storage facility and the three medium heat exchanger.

2. A heat transfer and storage system as defined by claim 1 wherein:
   the second heat exchange coil includes a first thermally conductive fluid passageway;
   the third heat exchange coil includes a second thermally conductive fluid passageway; and
   the heat transfer means of the three medium heat exchanger is in heat transfer relation with the first fluid passageway, the second fluid passageway, and outdoor air for transferring heat between the first fluid passageway and the second fluid passageway, between the first fluid passageway and outdoor air, and between the second fluid passageway and outdoor air.

3. A heat transfer and storage system as defined by claim 2 further including auxiliary heating means for supplying heat to the heat transfer fluid.

4. A heat transfer and storage system as defined by claim 3 wherein the auxiliary heating means comprises a solar heat collector for transferring radiant heat from the sun to the heat transfer fluid.

5. A heat transfer and storage system as defined by claim 4 wherein:
   the heat storage facility comprises an insulated tank for containing a liquid; and
   the heat transfer fluid comprises a liquid.

6. A heat transfer and storage system as defined by claim 5 wherein:
   the first fluid passageway comprises a first serpentine shaped heat exchange coil;
   the second fluid passageway comprises a second serpentine shaped heat exchange coil;
   the first and second serpentine shaped heat exchange coils are positioned in alternate, vertical, parallel planes with each other; and
   the heat transfer means of the three medium heat exchanger includes at least one heat transfer fin common to both the first and second serpentine shaped heat exchange coils.

7. A method of heating and cooling an enclosure comprising the steps of:
   operating a heat pump to transfer heat between an indoor heat exchange coil located within the enclosure and an outdoor heat exchange coil located outside the enclosure;
   transferring heat between the indoor coil and the enclosure by passing ambient air over the indoor coil;
   storing heat transferred between the indoor coil and the outdoor coil by circulating a heat transfer fluid between a heat storage facility and a third heat exchange coil located in thermal contact with the outdoor coil; and
   transferring stored heat between the heat storage facility and outdoor air by circulating the heat transfer fluid between the heat storage facility and the third heat exchange coil and passing outdoor air over the third heat exchange coil.

8. The method of claim 7 further comprising the step of simultaneously transferring heat between both the outdoor air and the heat storage facility and the outdoor coil by passing ambient air over the outdoor coil, and simultaneously circulating the heat transfer fluid through the third heat exchange coil.

9. The method of claim 8 wherein:
   the third heat exchange coil is located outside the enclosure; and
   further comprising the step of storing heat from the outdoors by circulating the heat transfer fluid between the third heat exchange coil and the heat storage facility, and passing ambient air over the third heat exchange coil.

10. The method of claim 9 further comprising the step of supplying auxiliary heat to the heat transfer medium.

11. The method of claim 10 wherein the step of supplying auxiliary heat includes the step of transferring radiant heat from the sun to the heat transfer medium.

12. A heat transfer and storage system for maintaining a temperature within an enclosure comprising:
- a three medium heat exchanger including a first heat exchange coil, a second heat exchange coil, heat transfer means thermally connecting the first and second coils, and means to pass ambient air over the coils;
- a heat pump of the type having an indoor coil located within the enclosure and an outdoor coil located outside the enclosure, wherein the outdoor coil is the first coil of the three medium heat exchanger;
- a heat storage means for storing a heat transfer fluid; and
- connecting means connecting the heat storage means and the second coil of the three medium heat exchanger, wherein the heat transfer fluid circulates and transfers heat between the heat storage means and the three medium heat exchanger.

13. A heat transfer and storage system as defined by claim 12 wherein:
- the heat transfer means of the three medium heat exchanger includes a plurality of heat transfer fins in thermal contact with the ambient air, the first heat exchange coil, and the second heat exchange coil; and
- further including means to transfer radiant heat from the sun to the heat transfer fluid.

* * * * *